J. H. PROUTY & S. S. SPRAGUE.
Burr-Roll for Loom-Temple.

No. 226,548.   Patented April 13, 1880.

WITNESSES:
C. Neveux,
C. Sedgwick.

INVENTOR:
J. H. Prouty,
BY S. S. Sprague,
Munn & Co.
ATTORNEYS.

UNITED STATES PATENT OFFICE.

JOEL H. PROUTY AND SOLON S. SPRAGUE, OF WORCESTER, MASS.

BURR-ROLL FOR LOOM-TEMPLES.

SPECIFICATION forming part of Letters Patent No. 226,548, dated April 13, 1880.

Application filed May 27, 1879.

*To all whom it may concern:*

Be it known that we, JOEL H. PROUTY and SOLON S. SPRAGUE, of Worcester, in the county of Worcester and State of Massachusetts, have invented a new and Improved Burr-Roll for Loom-Temples, of which the following is a specification.

Heretofore temple-rolls of the class to which ours belongs have been constructed solid save a central bore or cavity to receive the axes, and their roughened or toothed periphery has been formed of sheet-metal strips having struck-up teeth.

Our invention consists of a hollow roll whose body and periphery are one, being formed of sheet metal, which is provided with triangular teeth formed by cutting V-shaped slits in the metal and striking up the pieces thus partly severed from the sheet, while the ends of the roll are provided with openings for insertion of fibrous packing material and of the lubricant for the bearings of the cylinder, as hereinafter described.

Figure 1:
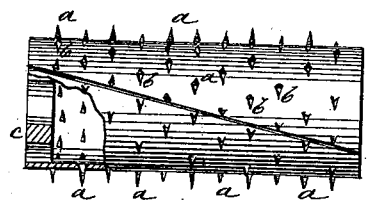
Figure 2:
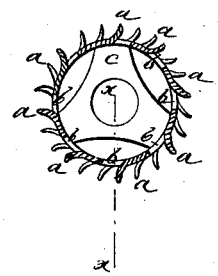

In the accompanying drawings, Figure 1 is a side view of the roll, with one end partly in section on line $x x$ of Fig. 2. Fig. 2 is a cross-section of the roll.

The periphery or body of the burr-roll or cylindrical temple is formed of one or more plates of sheet metal having teeth $a$, and the end portions are formed of spiders $c$, to the extremities of whose arms the sheet-metal cylinder is attached. The teeth $a$ of the roll have a triangular shape, being formed by cutting V-shaped slits in the metal while it is in the flat, or before it is formed into a cylinder, and then pressing outward and bending up or curving the triangular tongues or pieces of metal inclosed by the sides of such slits.

The larger diameters of the triangular openings $b$ are at right angles to the axis of the roll, and the apices of the openings point in the direction of motion of the roll. The teeth $a$ incline slightly in the same direction, so that they take a firm hold in the cloth.

The form of the spider $c$ is such as to leave elliptical-shaped openings between its arms and the periphery of the toothed cylinder. Such form and location of the openings facilitate insertion of the capillaceous material and the lubricant into the cylinder.

The fibers of the cloth work through the V-shaped apertures $b$, whereby the roll eventually becomes so tightly packed that it is impossible for any oil to spatter out, and so much can be absorbed at one time that oiling will be necessary but seldom.

As previously intimated, we do not claim, broadly, temple-rolls having a toothed periphery formed of sheet-metal strips provided with teeth formed by punching holes in the metal; and we are also aware that the use of triangular teeth formed by slitting sheet metal and bending up the triangular pieces thus partly severed is not new in non-analogous inventions, such as waste-pickers.

What we therefore claim is—

The improved hollow burr-roll for loom-temples, consisting of the body and periphery, formed of sheet metal having openings, and triangular teeth formed integrally with said body, and the heads $c$, having openings for insertion of packing material and lubricant, as shown and described.

JOEL HARVEY PROUTY.
SOLON SMITH SPRAGUE.

Witnesses:
JOHN A. McGAFFEY,
U. T. BLAKE.